(12) United States Patent
Kloos et al.

(10) Patent No.: US 7,277,405 B2
(45) Date of Patent: Oct. 2, 2007

(54) TIMING RECOVERY AND CROSS TALK PREVENTION IN THE PRESENCE OF CO-CHANNEL INTERFERENCE

(75) Inventors: Michael N. Kloos, Belvidere, IL (US); David A. Hensley, Wheaton, IL (US); Christopher L. Johnson, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1031 days.

(21) Appl. No.: 10/034,411

(22) Filed: Dec. 27, 2001

(65) Prior Publication Data

US 2003/0123400 A1 Jul. 3, 2003

(51) Int. Cl.
*H04B 7/185* (2006.01)
(52) U.S. Cl. .................... 370/317; 370/337
(58) Field of Classification Search ............. 370/317, 370/337, 311, 321, 442, 458, 347, 280, 318, 370/459; 455/522, 13.4
See application file for complete search history.

(56) References Cited

U.S. PATENT DOCUMENTS 5,301,225 A * 4/1994 Suzuki et al. ............. 455/574

6,044,069 A * 3/2000 Wan ........................... 370/311

FOREIGN PATENT DOCUMENTS

EP 0615352 * 8/1994

* cited by examiner

*Primary Examiner*—Chi Pham
*Assistant Examiner*—Alexander O. Boakye

(57) ABSTRACT

A system for reducing or eliminating cross talk resulting from co-channel interference in TDMA communication systems is disclosed. In general, the system may include one or more enhanced mobile stations sending, to an enhanced base station, base station identifying information in a training period that was previously used by mobile units to send pseudotrainiug information. The base station identifying information may include, but is not limited to, global cell site identification or any portion thereof or local cell site identification or any portion thereof. Upon receipt of information including the appropriate base station identifying information, die enhanced base station may perform enhanced synchronization and reception and correction functions.

17 Claims, 5 Drawing Sheets

TIMING RECOVERY AND CROSS TALK PREVENTION IN THE PRESENCE OF CO-CHANNEL INTERFERENCE

TECHNICAL FIELD

This disclosure relates generally to communication systems and, more specifically, to techniques and devices for aiding in timing recovery and the prevention of cross talk in the presence of co-channel interference in a communication system.

BACKGROUND

Mobile communication systems such as cellular and personal communication systems (PCS) have become ubiquitous. Such systems commonly include base station hardware, which may be commonly referred to as infrastructure, that exchanges information with mobile stations such as mobile telephones or the like. As will be appreciated, a particular base station hardware installation provides communication service coverage for the geographical area in which the base station hardware installation is located. Accordingly, multiple base station hardware installations are required to provide communication services to broad geographical areas. Each base station is capable of handling a finite number of calls at one time.

The convenience and relatively low cost of mobile stations and their attendant services has lead to a high market penetration, resulting in numerous geographical areas in which communications traffic is extremely dense. As communication traffic density increases, it becomes necessary for more base station hardware installations to be distributed throughout a given geographical area. The increased geographical density in base station installations can lead to problems such as, for example, increased interference.

Communication system technology may be roughly lumped into several categories: time-division multiple access (TDMA), frequency-division multiple access (FDMA) and code-division multiple access (CDMA), of which TDMA and CDMA are becoming the most popular. As the name implies, a TDMA system operates on a time-multiplexed scheme in which a base station listens only to one mobile station during a particular time slot. One example of TDMA technology is the iDEN (integrated dispatch enhanced network) system designed and provided by Motorola, Inc. of Schaumburg, Ill.

Due to of the great number of base station sites and a finite frequency band allocated to TDMA systems, base stations located in geographically disparate areas from one another may use the same frequencies to communicate with mobile stations. This concept is called frequency re-use. As demand for TDMA mobile stations and service density increased, base stations geographically close to one another began to reuse frequencies, which lead to an increased probability of a mobile station in communication with a first base station on a frequency (e.g., $f_1$) interfering with the ability of a second base station to receive a desired signal at that same frequency (e.g., $f_1$). This interference situation is referred to as co-channel interference because the interference is located on the same channel (i.e., is at the same frequency) as the desired signal.

As will be readily appreciated, TDMA mobile stations typically operate on battery power and battery life is a major concern. To conserve battery life, a mobile station may turn off its transmitter when the mobile station is not sending information to a base station. For example, if a mobile station user is only listening to information on his or her mobile station, the mobile station may disable its transmitter. The situation in which the mobile station disables its transmitter is commonly referred to as DTx (discontinuous transmit).

When a mobile station enters a DTx mode of operation, the base station with which that DTx mode mobile station was communicating is susceptible to a particularly deleterious effect of co-channel interference that is commonly referred to as cross talk. Cross talk can result when desired and undesired mobile stations are within reception range of a base station, but the desired mobile station is closer to the base station and, therefore, provides sufficient transmit power to overpower the undesired mobile station so that the base station only receives information from the desired mobile station. If the desired mobile station enters the DTx mode, the transmit power provided by the desired mobile station drops to a level below that of the undesired mobile station. Accordingly, upon DTx of the desired mobile station, the base station may receive undesired audio transmissions from the undesired mobile station. The undesired audio transmissions may be processed by the base station and, therefore, unintended audio may be coupled to the telephone of the person who was previously communicating with the user of the desired mobile station. The reception of the undesired mobile station transmission by the base station is known as cross talk.

In an attempt to eliminate or at least reduce the probability of cross talk in the iDEN system, one of sixteen different color codes, or designators, were assigned to base stations and those color codes were used by mobile stations when communicating with the base stations. The addition of color designators provided an auxiliary manner in which base stations could distinguish a co-channel interferer (i.e., a potential source of cross talk) from a desired transmission because only the desired transmission would have the proper color designator of the base station embedded therein. The sixteen color designators were assigned to base stations so that geographically proximate base stations that may reuse a frequency had different color designators. When receiving communications, each base station would look for its own color designator in the received signal. If the proper color designator were present in the signal, the base station would process the signal. Alternatively, if the proper color designator were not present, the base station would disregard the received signal as cross talk.

An exemplary illustration of a color code system 5 is provided in FIG. 1. The color code system 5 includes a number of base stations 10–14, which are referred to as the blue base station 10, the green base station 12 and the red base station 14. Each base station 10–14 provides a cell of communication coverage, referred to with reference numerals 16–20. In general, mobile stations communicate with the base station responsible for maintaining the cell in which the mobile station is located. For example, a mobile station 22 communicates with the blue base station 10 and mobile stations 24 and 26 communicate with the green base station 12. Additionally, a mobile station 28 communicates with the red base station 14.

As shown generally in FIG. 1, each mobile station 22–28 communicates with its respective base station 10–14 using a frequency (e.g., $f_1$–$f_4$). In the transmit path from the mobile station 22–28 to the base station 10–14, the mobile units also communicate the color of the base station 10–14 with which they are communicating. For example, the mobile station 22 receives communication from the blue base station 10 at frequency $f_2$, but transmits information to the blue base station 10 on frequency $f_1$ and includes in the information transmitted on frequency $f_1$ the color blue. Accordingly, FIG. 1 reflects communication from the mobile unit 22 to the blue base station 10 with the designator $f_{1B}$, representing frequency one, blue base station.

The mobile unit 24 also uses $f_1$ to communicate with the green base station 12, but it also includes the color green (G) in its transmissions. Likewise, the mobile unit 26 communicates with the green base station 12 on frequency $f_3$ with the green designator (G). Further, the mobile station 28 communicates with the red base station 14 using $f_3$, but includes the red designator (R).

The use of the color designators prevents the base stations 10–14 from inadvertently processing cross talk signals received from a mobile station transmitting on the same frequency as a desired mobile station, but whose signals are not intended for the base station that inadvertently receives the signals. For example, as shown in FIG. 1, the green base station 12 may be exposed to a signal from the mobile station 22, which transmits at frequency $f_1$. The use of color designators enables the green base station 12 to receive the signal from the mobile station 22, to determine that such a signal is not intended to be received by the green base station 12 and to discard any cross talk information received from the mobile station 22. Similarly, the green base station 12 may disregard co-channel information received from the mobile station 28, because such information is not intended for the green base station 12 and, in fact, may be the source of cross talk in the system.

Referring to FIG. 2, an exemplary slot 40 that may, for example, be transmitted by a mobile unit in the iDEN system includes a number of symbols, four exemplary types of which are referred to with reference numerals 42–48. The slot 40 may be 15 milliseconds (ms) in length and may include four subchannels 50–56 in which the symbols 42–48 may be transmitted.

The symbol 42 is representative of a training waveform that is transmitted by the mobile station upon power changes, frequency changes or if the mobile station has not sent a training waveform for 200 slots. The symbol spaces used for sending a training waveform are sent during a training period 58. In practice, training waveforms are sent less than 1% of the time. When training waveforms are not sent, pseudotraining waveforms, which serve no purpose other than that of filler data that may be detected as the pseudotraining waveform, may be sent during the training period 58.

The symbol 44 represents a synchronization (sync) symbol that a base station uses to adjust the phase, amplitude and timing based on the sync symbols received from a mobile station. The symbol 46 represents a data symbol in which the mobile station may transmit data representative of voice, audio or any other suitable information. The symbol 48 represents pilot symbols that the mobile station may transmit to the base station for the base station to use in fading detection and compensation.

As shown in the constellation of FIG. 2A, each symbol may represent four data bits that are transmitted using a quadrature amplitude modulation (QAM) scheme or any other suitable modulation scheme, such as, for example, phase shift keying (PSK), differential quadrature phase shift keying (DQPSK) or the like.

The mobile station transmits the color designators in each slot 40 it sends to the base station. For example, the mobile station typically sends the color designators in symbols 59a and 60a, as well as in symbols 59b and 60b.

Despite the added cross talk protection provided by the 16 color designations, as TDMA base stations, such as, for example, the iDEN base stations, become more densely geographically located, cross talk may still be an issue. This is because first and second base stations having identical colors and receive frequencies may be located proximately enough for a mobile station communicating with the first base station to interfere with the second base station.

BRIEF DESCRIPTION OF THE DRAWINGS

FIG. 2 illustrates the known configuration of a communication time slot in a TDMA system;

Skilled artisans will appreciate that elements in the figures are illustrated for simplicity and clarity and have not necessarily been drawn to scale. For example, the dimensions of some of the elements in the figures may be exaggerated relative to other elements to help to improve understanding the disclosure.

DETAILED DESCRIPTION

Disclosed in detail hereinafter is a system for reducing or eliminating cross talk created by co-channel interference in TDMA communication systems. In general, the system may include one or more enhanced mobile stations sending base station identifying information (hereinafter referred to as a cell site ID) in a training period 58 that was previously used by mobile units to send pseudotraining information. The cell site ID may include, but is not limited to, global cell site identification or any portion thereof or local cell site identification or any portion thereof. Alternatively, the cell site ID may be any other information that identifies a base station within a broad geographical area. The cell site ID may have good autocorrelation and cross-correlation properties.

A particular enhanced base radio ensures that received communications are indeed intended for that particular enhanced base radio by checking to ensure that the particular enhanced base radio is, in fact, part of the base station identified in the training period 58 sent by a particular mobile unit. If a particular enhanced base radio determines that the particular enhanced base radio is not part of the base station identified in the training period 58, the received information may be ignored, thereby eliminating cross talk. The elimination of pseudotraining information in favor of information that aids in the identification of the base station does not compromise system performance because pseudotraining information is nothing more than known filler information that provides no benefit to the system in terms of cross talk prevention. An additional benefit to the disclosed system is the fact that enhanced base radio may perform enhanced synchronization and delay estimation functions using the cell site ID to synchronize more closely the enhanced base radio with an enhanced mobile station, thereby providing enhanced symbol timing for demodulation. The delay estimation functions may be used to more accurately determine branch delay in a diversity system.

The following includes descriptions limited to pertinent aspects of an enhanced mobile station and an enhanced base radio in conjunction with FIGS. 3–6 and FIGS. 7–9, respectively. Full descriptions of the enhanced mobile station and the enhanced base radio components and operation thereof apart from the relevance of the cross talk reduction system disclosed herein have been suppressed in favor of clarity.

Figure 1:
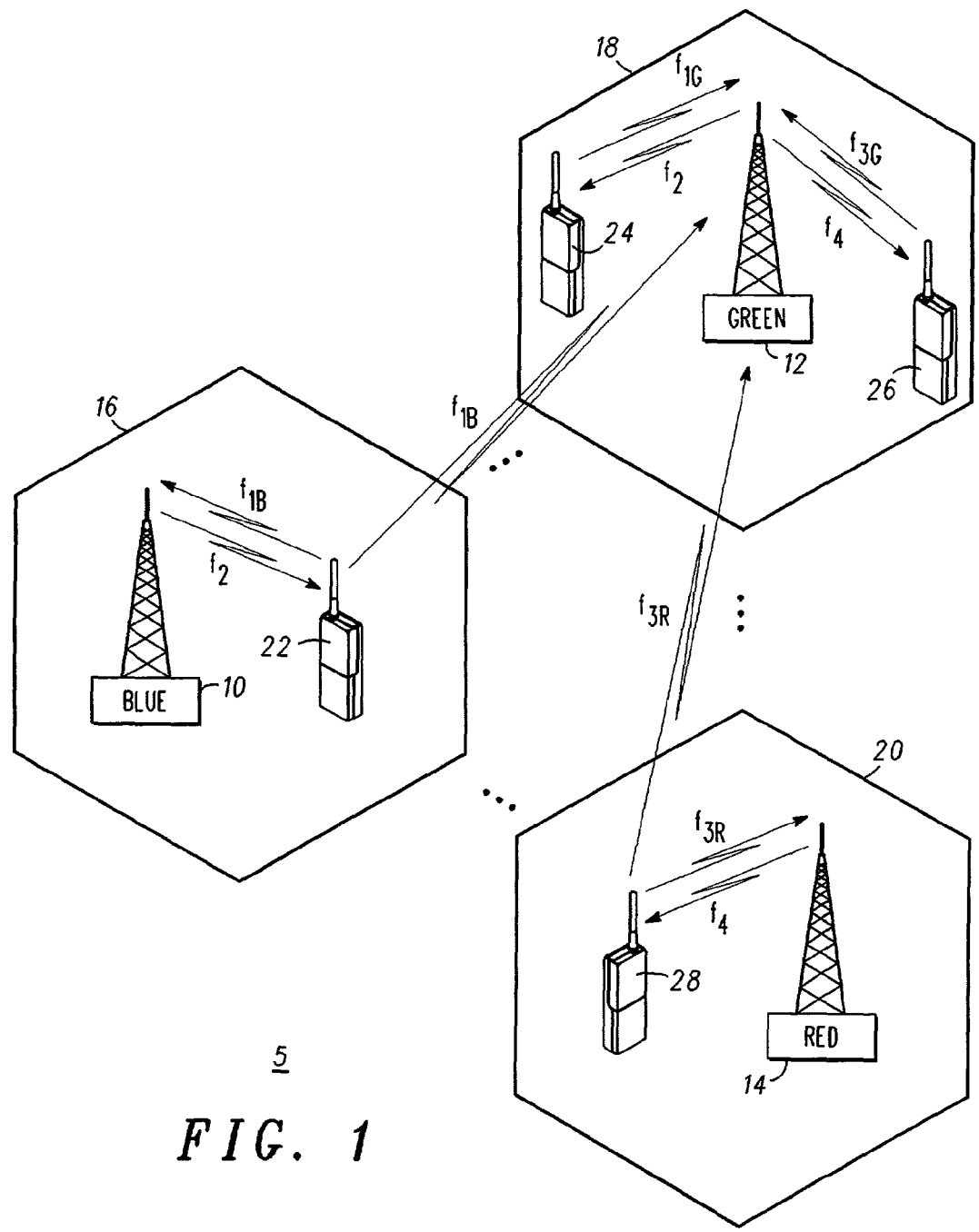
FIG. 1 illustrates the known concept of using color designators to reduce cross talk in a TDMA system.
Figure 3:
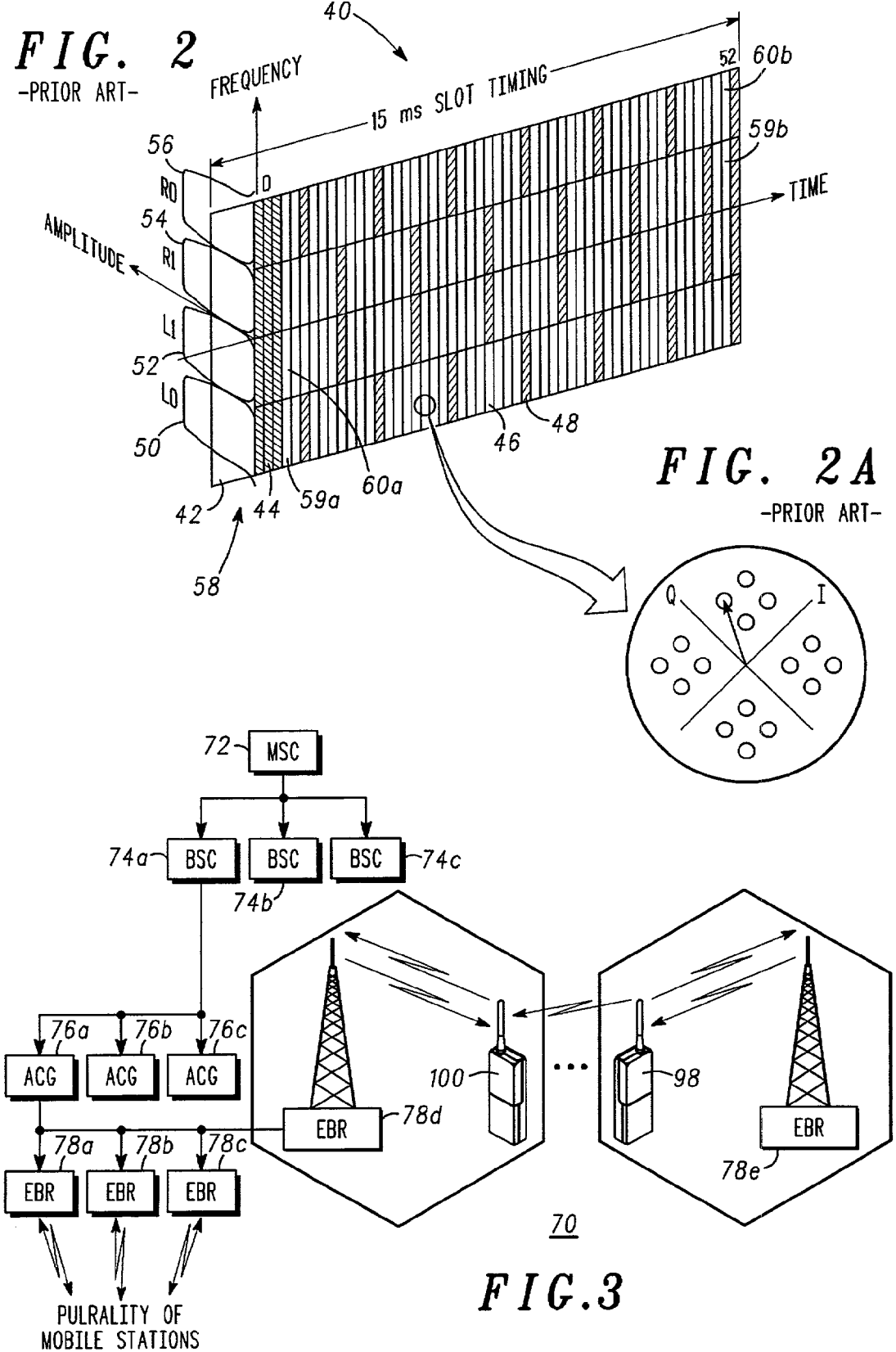
FIG. 3 illustrates an exemplary configuration of TDMA infrastructure including an enhanced base radio in communication with enhanced mobile stations.

As shown in FIG. 3, an exemplary TDMA infrastructure 70 may include a mobile switching center (MSC) 72 that communicates with and controls a number of base site controllers (BSC), three of which are shown in FIG. 3 at reference numerals 74a–74c. Each BSC (e.g., the BSC 74a) is coupled to a numbers of access controller gateways (ACGs) 76a–76c. Each ACG (e.g., the ACG 76a) is, in turn, coupled to a number of enhanced base radios (EBRs) 78a–78e. The arrangement of items 72–76 in FIG. 3 is well known to those having ordinary skill in the art and, therefore, a rigorous description of FIG. 3 is suppressed, but the operation of relevant components of FIG. 3 is disclosed in connection with FIG. 5 below. However, the EBRs 78 are not known because these devices include functionality enabling the EBRs 78 to reduce cross talk more effectively than conventional base radios.

As shown in FIG. 3, the EBR 78d, for example, may receive communication from enhanced mobile stations 98, 100, one of which is inside a coverage cell provided by the EBR 78d and one of which is outside the coverage cell provided by the EBR 78d, but is inside a coverage cell provided by the EBR 78e. The EBR 78d expects to receive communications from the enhanced mobile station 100, but does not expect to receive communications from the enhanced mobile station 98, because the EBR 78e handles the communications for the enhanced mobile station 98. Accordingly, communication from the enhanced mobile station 98 that is received by the EBR 78d would conventionally appear to be cross talk if the EBR 78d were a conventional base radio. As disclosed hereinafter, because the enhanced mobile stations 98, 100 identify the EBR 78d and EBR 78e, respectively, with which they intend to communicate and because the enhanced mobile station 98 does not intend to communicate with the EBR 78d, but intends to communicate with EBR 78e, the EBR 78d is able to identify and disregard the communication from the enhanced mobile station 98, thereby eliminating the possibility that such communication would be cross talk.

Figure 4:
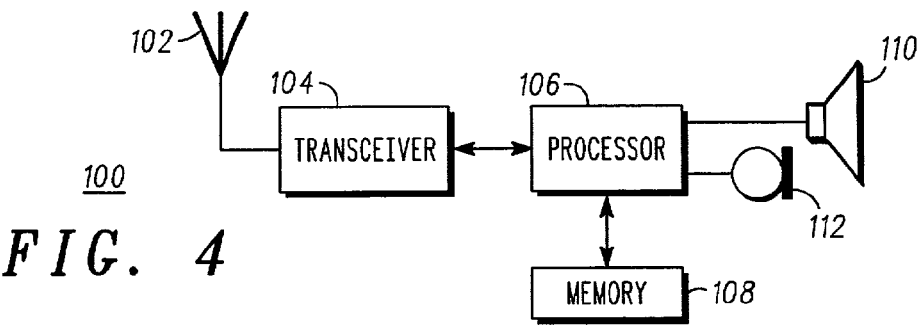
FIG. 4 is an exemplary simplified block diagram of the enhanced mobile station of FIG. 3.

Turning now to the description of mobile station aspects of the system in connection with FIG. 4. The enhanced mobile station 100 generally includes an antenna 102 coupled to a transceiver 104 that may be further coupled to a processor 106. The processor 106 may be coupled to a memory 108, a speaker 110, such as an earpiece speaker, and a microphone 112. The processor 106 may be a conventional microprocessor or may be a digital signal processor (DSP). Additionally, while a single processor 106 is shown, it will be readily understood that the enhanced mobile station 100 may include one or more additional processors. For example, the enhanced mobile station 100 may include a conventional microprocessor in combination with a DSP. For the purposes of this description, it should be assumed that the enhanced mobile station 100 is embodied in a TDMA technology mobile station, such as an iDEN mobile station, having additional functionality over and above that which is previously known. However, such an embodiment is merely exemplary.

As will be readily appreciated, the enhanced mobile station 100 operates in both transmit and receive modes. In the receive mode, the antenna 102 receives incident radio waves having information encoded therein and converts the incident waves into signals that are coupled to the transceiver 104. The transceiver 104 may downconvert, filter or otherwise suitably process the signals. The output of the transceiver 104, which may include digital signals representative of the signals received by the antenna 102, is coupled to the processor 106.

The processor 106 may perform various operations on the digital signals. For example, the processor 106 may perform error detection and correction, as well as deinterleaving and other known functions traditionally performed by processors of conventional TDMA mobile units. To perform various processing functions, the processor 106 may utilize the memory 108 to store instructions, to store data samples or to recall various items of information that the processor 106 may need.

The processor 106 creates an output signal representative of the information, such as, for example, audio or voice information, that was encoded in the incident radio wave. Because such information may be audio, the output from the processor 106 is coupled to the speaker 110 so that the audio information may be manifest to a user of the enhanced mobile unit 100. As detailed hereinafter, with respect to FIG. 5, the enhanced mobile unit 100 may also acquire various portions of control information such as, for example, a cell site ID or the like from a broadcast control channel of the EBR 78d and may store the same for later use.

In the transmit path, the microphone 112 receives sound or voice information and converts such information to electrical signals that are coupled to the processor 106. The processor 106 may perform various functions on the voice information such as, for example, voice encoding, compressing, channel coding and the like to create processed audio. The processed audio is coupled from the processor 106 to the transceiver 104, which properly upconverts and amplifies the processed audio for transmission to the EBR 78d via the antenna 102. Although the example of audio information has been given, as described in connection with FIG. 6, other data or information such as a cell site ID or the like may be sent from the enhanced mobile station 100 to the EBR 78d.

Figure 5:
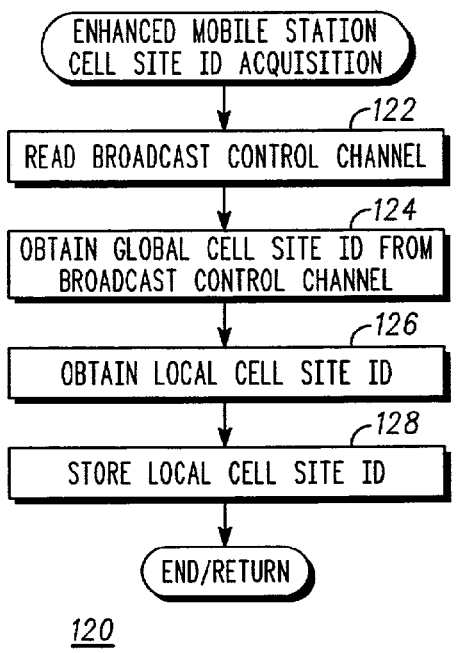
FIG. 5 is an exemplary enhanced mobile station cell identification acquisition routine that may be executed by the processor of the enhanced mobile station of FIG. 4.
Figure 6:
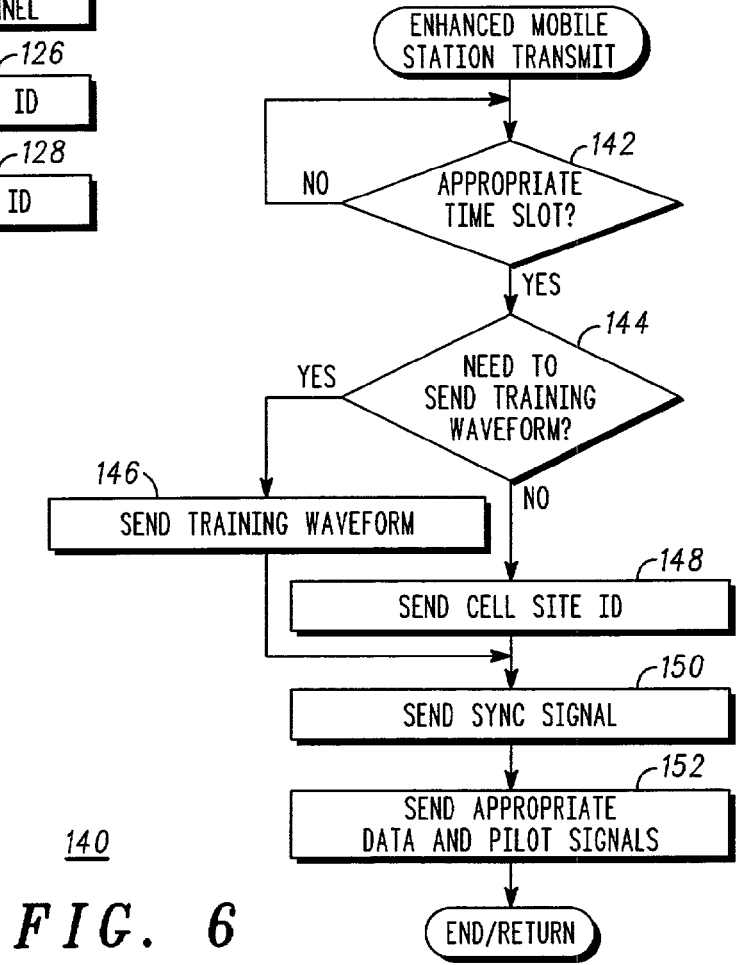
FIG. 6 is an exemplary enhanced mobile station transmit routine that may be executed by the processor of the enhanced mobile station of FIG. 4.

The processor 106 of the enhanced mobile station 100 may execute various software routines, two of which are shown in FIGS. 5 and 6. Although each of FIGS. 5 and 6 represents a complete routine or subroutine, it should be noted that the blocks illustrated in FIGS. 5 and 6 may be a portion or portions of larger routines or subroutines. Additionally, the order in which the blocks of FIGS. 5 and 6 are placed is merely exemplary and those skilled in the relevant art will readily recognize that the order of execution of the blocks in the drawings may be altered.

Turning to FIG. 5, an enhanced mobile station cell ID acquisition routine 120 begins at block 122 where the enhanced mobile station 100 reads the broadcast control channel on which the EBR 78d with which the enhanced mobile station 100 is communicating transmits various pieces of control information. After the block 122 sets the mobile station 100 to read the broadcast control channel, block 124 obtains the global cell site ID from the broadcast control channel. As will be readily appreciated, the global cell site ID is a 56-bit number that uniquely identifies each cell site in the world.

After block 124 obtains the global cell site ID, block 126 obtains the local cell site ID of the EBR 78*d* with which it is communicating. The local cell site ID may be obtained from the broadcast control channel or the enhanced mobile station 100 may derive the local cell site ID from the global cell identification obtained in block 124.

After block 126 completes execution, control passes to block 128, which stores the local cell identification within the enhanced mobile station 100. For example, after the processor 106 executes block 126 and obtains the local cell site ID, the processor 106, at block 128, may store the local cell site ID in the memory 108 for later use.

An enhanced mobile station transmit routine 140, as shown in FIG. 6, makes use of the training period 58 to send information, such as a cell site ID, which aids the EBR 78*d* in discerning whether communication transmitted by the enhanced mobile station 100 is intended for the EBR 78*d* or for a different EBR.

The execution of the enhanced mobile station transmit routine 140 begins at block 142, where the enhanced mobile station 100 determines if the present time is the appropriate time slot for the enhanced mobile station 100 to send information to the EBR 78*d*. When the appropriate time for sending information to the EBR 78*d* occurs, control passes from block 142 to block 144, which determines if a training waveform needs to be sent by the enhanced mobile station 100. If a training waveform needs to be sent, control passes to block 146, which sends the training waveform.

Alternatively, if no training waveform needs to be sent, control passes from block 144 to block 148. At the block 148, the enhanced mobile station 100 sends a cell site ID during the training period 58, as opposed to sending a pseudotraining waveform. As noted previously, the cell site ID may include, but is not limited to, a global or local cell site ID or any other information that uniquely identifies an EBR within a geographical area. The cell site ID may be as few as 4 bits of information or may be as large as, for example, 16 bits, or may be any other suitable size.

After the execution of either or blocks 146 or 148, control passes to block 150, at which point the enhanced mobile station 100 sends a sync signal to the EBR 78*d*. After the sync signal has been sent, block 152 sends appropriate data and pilot signals, which are used by the EBR 78*d* to receive information and to perform timing corrections. The operations performed at blocks 150 and 152 are known and, therefore, a protracted description thereof is omitted.

Figure 7:
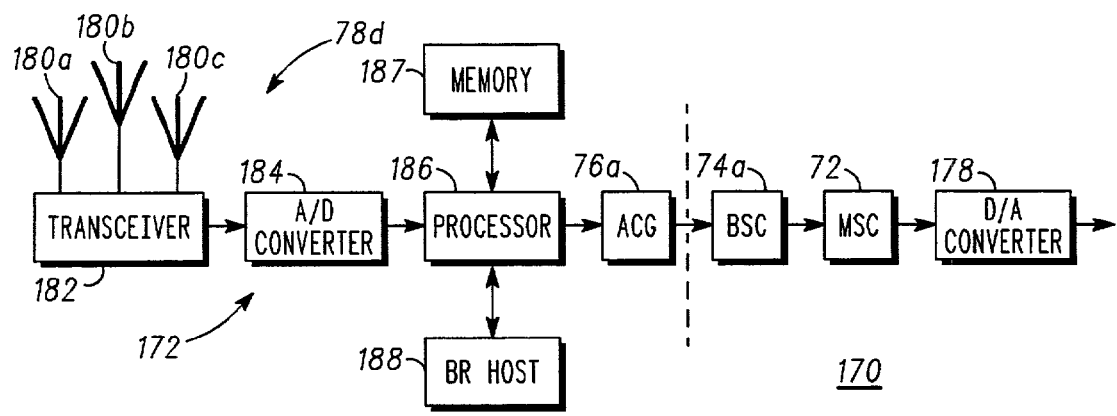
FIG. 7 is an exemplary block diagram of a TDMA communication system illustrating additional detail of an enhanced base radio.
Figure 8A:
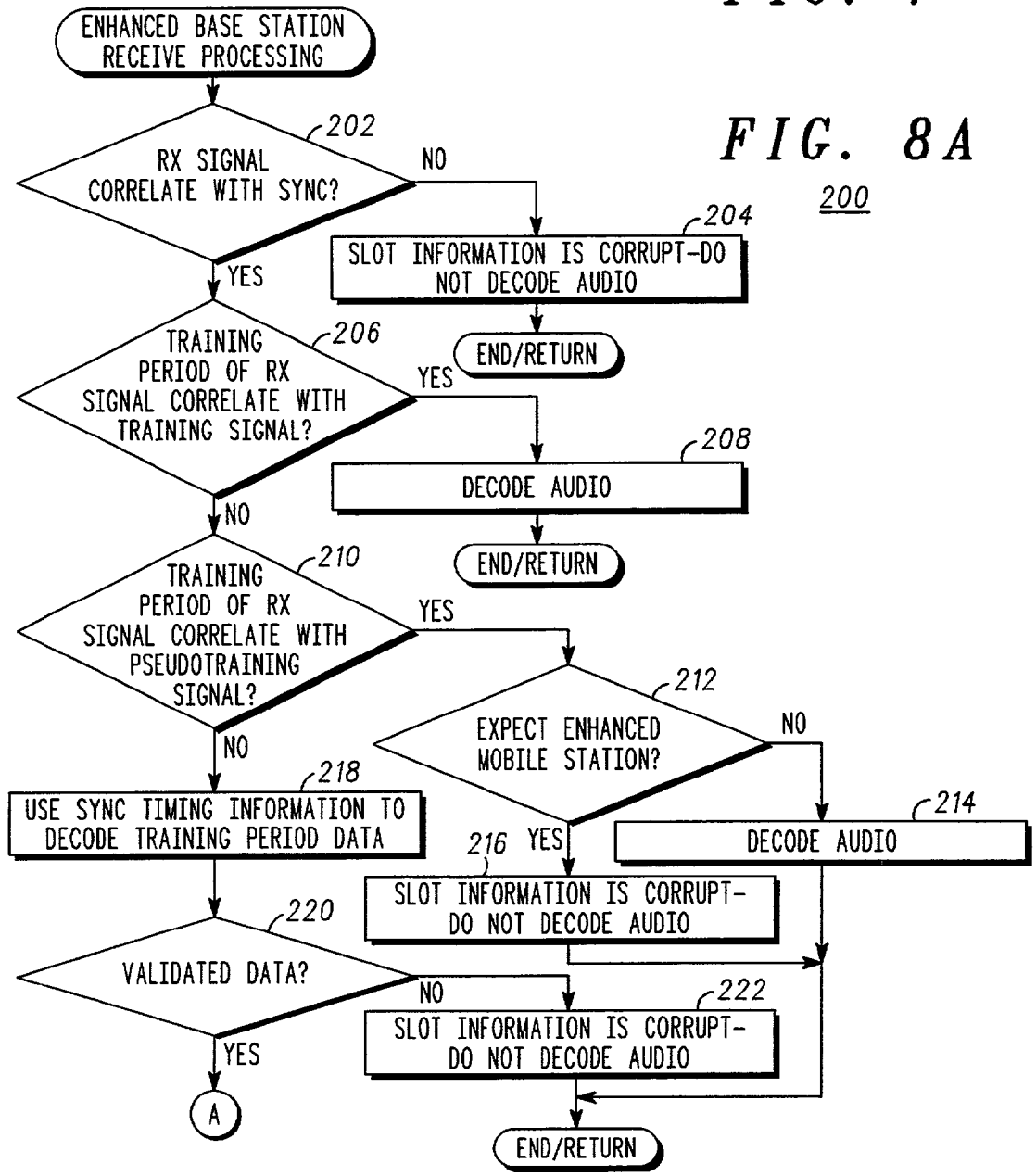
FIGS. 8A and 8B collectively form FIG. 8, which is an exemplary enhanced base radio receive processing routine that may be executed by the processor of FIG. 7.
Figure 8B:
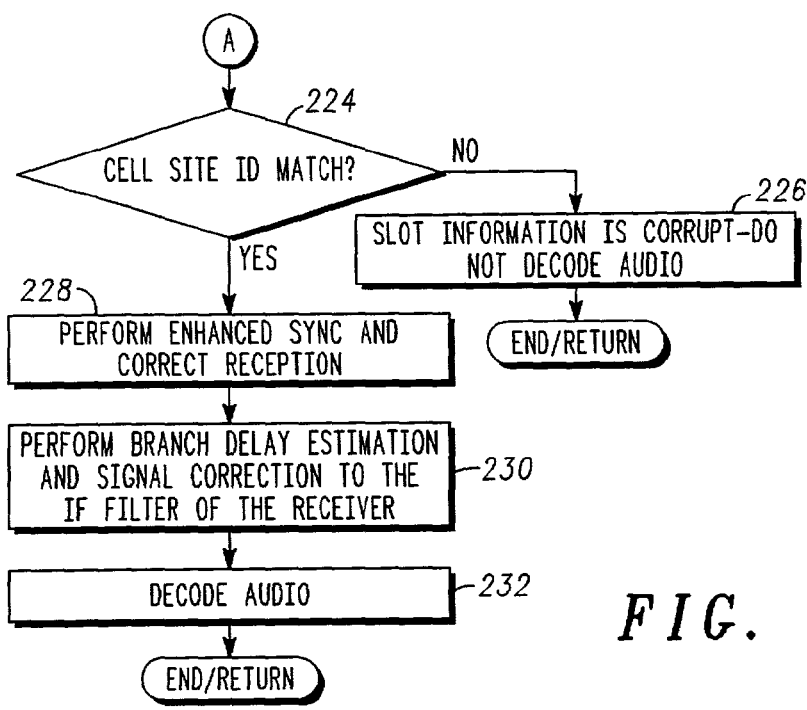

A TDMA system 170, as shown in FIG. 7, includes a base station 172 and various backhaul components 74*a*, 72 and 178. In general, the TDMA system 170 provides communications between mobile stations and a telephone network or between two mobile stations. It should be noted that only the components of the TDMA system 170 that are necessary to facilitate the description of the concepts disclosed herein are shown in FIG. 7.

The EBR 78*d* generally includes a number of antennas 180*a*–180*c* (collectively 180) coupled to a transceiver 182, which is further coupled to an analog to digital converter (A/D) 184. The output of the A/D 184 is coupled to a processor 186, which is also a part of the EBR 78*d* and may, in practice, be embodied in a DSP or any other suitable processing device. The processor 186 has an associated memory 187 on which various instruction sets or data may be stored. The processor 186 is coupled to a base radio host 188, which coordinates the call handling functionality of the EBR 78*d*. The processor 186 is also coupled to the ACG 76*a*, which controls the base radio 78*d* and routes information from the processor 186 to the appropriate BSC 74*a*.

The BSC 74*a* is further coupled to the MSC 72, which may be embodied in a telephone network routing switch. The MSC 72 is further coupled to a digital to analog converter (D/A) 178. The D/A 178 is further coupled to the telephone network, the details of which are not shown in FIG. 7.

Generally, during operation, the antennas 180, which may include diversity (not shown), receive radio wave signals having information embedded therein and couples the radio waves to the transceiver 184, which may appropriately amplify and downconvert the radio waves to recover the information embedded therein. The downconverted and amplified signals are coupled from the transceiver 182 to the A/D 184, which digitizes the signals and couples the digital representations of the signals to the processor 186.

The processor 186 may perform various audio and data processing functions that are not of particular interest in the context of the disclosed system. One particularly relevant function that may be performed by the processor 186 is described in conjunction with FIG. 8 below. In general, information output from the processor 186 may be packetized and compressed voice data, which the ACG 76*a* couples to the BSC 74*a*.

The BSC 74*a* decodes the packetized and compressed data to create pulse code modulated (PCM) voice signals that are coupled to the MSC 72. The MSC 72 routes the PCM voice signals to the D/A 178, which converts the PCM voice signals into analog audio that may be carried by the telephone network.

As noted previously in FIG. 5 with respect to the enhanced mobile station 100, the EBR 78*d* periodically sends the cell site ID to the enhanced mobile station 100. In addition to these and other functions, the EBR 78*d* also carries out the enhanced base station receive processing routine 200, shown in FIGS. 8A and 8B, collectively referred to as FIG. 8, to process information transmitted to the EBR 78*d* by the enhanced mobile station 100.

The routine 200 begins execution at block 202, where the EBR 78*d* determines if the received slot transmitted from the enhanced mobile station 100 correlates with the sync signal upon which the enhanced mobile station 100 and the EBR 78*d* have previously agreed. If the received signal does not correlate with sync, control passes to block 204. At the block 204, the EBR 78*d* discards the slot information because it is corrupt. Further, because the slot information is corrupt, audio is not decoded from the received signal, because such audio would be corrupt as well.

If, however, block 202 determines that the sync portion of the received slot correlates with sync, control passes to block 206, which determines if the training period 58 of the received slot correlates with the training signal. If there is such a correlation, control passes to block 208, where the EBR 78*d* decodes audio in a known manner. Alternatively, if block 206 determines that the training period 58 of the received signal does not correlate with the training signal, control passes to block 210.

Block 210 determines if the training period 58 of the received slot correlates with the known pseudotraining signal. If the signal in the training period 58 of the received slot correlates with the pseudotraining signal, control passes to block 212, which determines whether an enhanced mobile station should be expected to be communicating in the time slot of information that the EBR 78*d* is processing. This expectation may be determined during call set up or handoff and the block 212 may make exceptions based on service provided to a mobile station that has just established communication with the base station. For example, if a new mobile station comes into communication with the EBR 78*d* from a handoff, the EBR 78*d* may presume that there is no expectation that the new mobile station is an enhanced mobile station, thereby preventing the EBR 78*d* from inadvertently discarding audio information that it needs to process.

If an enhanced mobile station is not expected, control passes to block 214, at which point the EBR 78*d* decodes the audio in the received slot. Alternatively, if communication from an enhanced mobile unit is expected, control passes from block 212 to block 216 at which point the slot information is determined to be corrupt and the EBR 78*d* does not decode slot information into audio. This is because the EBR 78*d* expects to see the cell site ID in the training period 58 and, therefore, does not expect to see the pseudotraining signal.

Returning to block 210, if the training period 58 does not correlate with the pseudotraining signal, control passes to block 218, at which point the EBR 78*d* uses the sync timing information to decode the information in the training period 58 of the received slot. Block 220 attempts to validate the data decoded at block 218 by, for example, performing a cyclic redundancy check (CRC) or some other data integrity check. If block 220 determines that the data is not valid, control passes to block 222, which indicates that the slot information is corrupt and should not be decoded into audio.

Alternatively, if block 220 determines that the data is valid, control passes to block 224, which determines if the decoded information from the training period 58 matches the cell site ID, which would be included in any information from an enhanced mobile station that is in communication with the EBR 78*d*. If block 224 determines that there is no such match, control passes to block 226, which discards the slot information because it is deemed corrupt. Accordingly, at block 226, the slot information is not decoded into audio.

If, however, the decoded information from the training period 58 matches the cell site ID, the enhanced mobile station that sent the slot of information must be an enhanced mobile station that is sending information to the EBR 78*d*. Accordingly, control passes from block 224 to block 228, which performs an enhanced synchronization using not only sync information, but the information provided by comparing the signals received during the training period with the known cell site ID. This enables the EBR 78*d* to further fine-tune the timing and phasing of its receiver.

After the enhanced synchronization and receiver correction of block 228 complete, control passes to block 230. At block 230, the EBR 78*d* performs branch delay estimation and signal correction to the IF filter of the receiver. The delay estimation performed by block 230 may be carried out over the information received in the training period 58.

After block 230 completes execution, block 232 decodes the audio information sent in the slot. The decoding performed at block 232 is similar to that of blocks 208 and 214, described above. After the execution of block 232, the routine 200 ends or returns control to the routine that called the routine 200.

FIGS. 7 and 8 in connection with the foregoing text describe the operation of the system in the context of software instructions that are executed by a processor. It should be noted, however, that the instructions described in connection with FIG. 8 may be embodied in dedicated hardware components, such as application specific integrated circuits (ASICs), that perform various aspects of the system described in conjunction with the routine 200 of FIG. 8.

Figure 9:
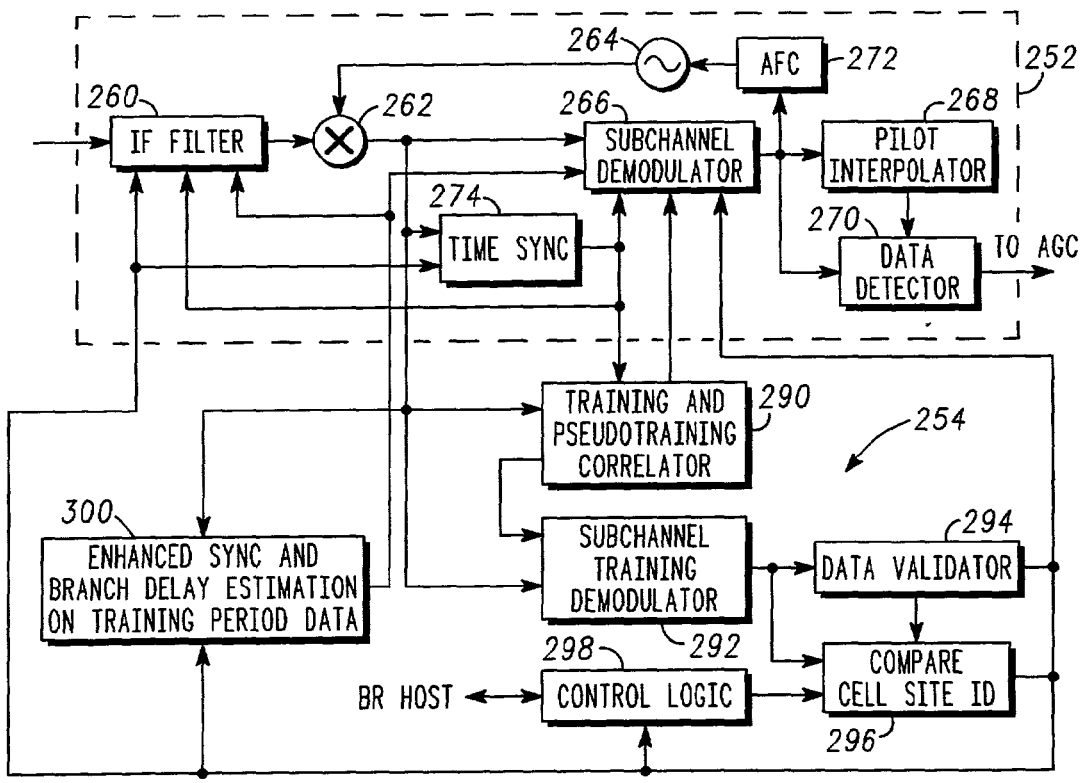
FIG. 9 is an exemplary block diagram of a receive modem that may be implemented in the system of FIG. 7.

By way of example, an enhanced modem 250 that may be implemented on, used in addition to, or in place of, the processor 186 of FIG. 7, is shown in FIG. 9. The enhanced modem 250 includes conventional modem functionality represented by the components disposed within the dotted box 252 of FIG. 9. The enhanced modem 250 also includes additional components 254 that provide the enhanced receive functionality described herein.

The conventional modem 252 includes an intermediate frequency (IF) filter 260 that receives a sampled signal from the A/D (FIG. 7) and changes the sample rate of the received sampled signal. The output of the IF filter 260 is coupled to a mixer 262, which may receive a second input from a voltage controlled oscillator (VCO) 264. The output of the mixer 262 is coupled to a subchannel demodulator 266 that demodulates the various subchannels of a received slot. As noted below, the subchannel demodulator 266 may be selectively enabled and disabled by the additional components 254 that provide the enhanced receive functionality.

The subchannel demodulator 266 demodulates the various portions of a received slot to generate sync, pilot and data outputs. The sync and pilot outputs are coupled to a pilot interpolator 268, which processes such signals to generate amplitude and phase adjustments that are coupled to a data detector 270, which receives data from the subchannel demodulator 266. The sync signal from the subchannel demodulator 266 is also coupled to an automatic frequency control (AFC) block 272 that drives the VCO 264.

The output of the mixer 262 is also coupled to a time sync block 274. The time sync block 274 processes the signals from the mixer 262 to develop fine and course tuning adjustments that are coupled to the subchannel demodulator 266.

In addition to the conventional modem components 252 described above, the enhanced modem 250 includes a training and pseudotraining correlator 290 and a subchannel training demodulator 292 that receive inputs from the mixer 262. The output of a subchannel training demodulator 292 is coupled to a data validator 294 and to a compare cell site ID block 296, which also receives an input from a control block 298. A block 300, which receives an input from the data validator 294 and the mixer 262 and has an output linked to the subchannel demodulator 266 and the IF filter 260, performs enhanced synchronization and branch delay estimation on the training period data. While the control logic 298 is shown as coupled only to the compare cell site ID block 296, it will be readily understood by those having ordinary skill in the art that the control logic 298 may be connected to any block shown in FIG. 9 to control logic and control signals thereto.

During operation, the training and pseudotraining correlator 290 correlates the output of the mixer 262 with the known training sequence and, if the two signals correlate, the block 290 enables the subchannel demodulator 266 to decode the mixer 262 output. Alternatively, if the output of the mixer 262 does not correlate with the training signal, the block 290 correlates the output of the mixer 262 with the known pseudotraining sequence. If the output of the mixer 262 correlates with the pseudotraining sequence, the block 290 enables the subchannel demodulator 266 and, if the EBR 78*d* expects communication with an enhanced mobile station, demodulates the output of the mixer 262.

Alternatively, if the training and pseudotraining correlator 290 determines that the output of the mixer 262 does not correlate with the pseudotraining sequence, but previously correlated with the training sequence, the block 290 enables the subchannel training demodulator 292. The block 292 demodulates the information in the training period of the slot and couples the demodulated information to the data validator 294. If the data validator 294 determines that the demodulated information is valid, the compare cell site ID block 296 is enabled and compares the demodulated information from the block 292 to the cell site ID of the base station, which is contained in the control logic 298 that receives information from the base radio host 188.

If the compare cell site ID block 296 determines that the information from the block 292 matches the cell site ID, the block 296 enables the subchannel demodulator 266 so that the information in the slot may be processed. Additionally, the block 296 enables block 300, which performs enhanced sync and branch delay estimation on the information contained in the training period 58. The functions of the block 300 may include, but are not limited to, performing enhanced synchronization and reception correction processing over information that includes the cell site ID. Additionally, the block 300 may perform delay estimation on the information in the training period 58 to aid in diversity signal reception. The operation of the block 300 results in information coupled to both the subchannel demodulator 266 and the IF filter 260 to aid in diversity reception.

Alternatively, if the block 296 determines that the information from the block 292 does not match the cell site ID, the block 296 disables the subchannel demodulator 266 and the information in the slot is not processed thereby. Further, if there is no match, the block 296 will not enable the block 300.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Benefits, other advantages and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A mobile station for sending information to a base station having an associated cell site identifier (ID), the mobile station comprising:
    a transmitter adapted to send information to the base station;
    a processor coupled to the transmitter;
    a memory coupled to the processor;
    a first instruction set stored in the memory and adapted to cause the processor to obtain the cell site ID associated with the base station;
    a second instruction set stored in the memory and adapted to cause the processor to determine an appropriate time slot in which to transmit information;
    a third instruction set stored in the memory and adapted to cause the processor to determine if a training waveform is to be transmitted during a training period of the appropriate time slot; and
    a fourth instruction set stored in the memory and adapted to cause the processor to control the transmitter to send the cell site ID associated with the base station when the training waveform is not transmitted during the training period of the appropriate time slot.

2. The mobile station of claim 1, wherein the cell site ID comprises a global cell site identifier of the base station.

3. The mobile station of claim 1, wherein the cell site ID comprises a local cell site identifier of the base station.

4. The mobile station of claim 1, further comprising a fifth instruction set stored in the memory and adapted to cause the processor to control the transmitter to send information to the base station in a time-multiplexed manner.

5. A base station for receiving a time slot of information having a training period therein from a mobile station of a communication system, the base station comprising:
    a receiver adapted to receive the time slot of information from the mobile station and to output a receive signal;
    a processor coupled to the receiver and adapted to process the receive signal;
    a memory coupled to the processor;
    a cell site identifier (ID) associated with the base station stored in the memory;
    a first instruction set stored in the memory and adapted to cause the processor to determine if the training period includes the cell site ID associated with the base station;
    a second instruction set stored in the memory and adapted to cause the processor to discard the time slot of information if the cell site identifier is not included in the training period; and
    a third instruction set stored in the memory and adapted to cause the processor to decode the time slot of information if the cell site ID is included in the training period.

6. The base station of claim 5, further comprising a fourth instruction set stored in the memory and adapted to cause the processor to determine if the receive signal correlates with a synchronization signal.

7. The base station of claim 6, further comprising a fifth instruction set stored in the memory and adapted to cause the processor to determine if the training period correlates with a training signal.

8. The base station of claim 7, further comprising a sixth instruction set stored in the memory and adapted to cause the processor to determine if the training period correlates with a pseudotraining signal.

9. The base station of claim 5, further comprising a fourth instruction set stored in the memory and adapted to cause the processor to perform synchronization functions based on the information in the training period if the cell site ID is included in the training period.

10. The base station of claim 5, further comprising a fourth instruction set stored in the memory and adapted to cause the processor to perform branch delay estimation based on the information in the training period and to correct the operation of the receiver based thereon if the cell site ID is included in the training period.

11. The base station of claim 5, wherein the cell site ID comprises a global cell site identifier of the base station.

12. The base station of claim 5, wherein the cell site ID comprises a local cell site identifier of the base station.

13. A method for receiving at a base station having an associated cell site identifier (ID), a time slot of information having a training period therein, the method comprising:
    receiving the time slot of information and outputting a receive signal based thereon;
    determining if the training period includes the cell site ID associated with the base station;
    discarding the time slot of information if the cell site ID is not included in the training period;
    decoding the time slot of information if the cell site ID is included in the training period; and
    determining if the receive signal correlates with a synchronization signal.

14. The method of claim 13, further comprising determining if the training period correlates with a training signal.

15. The method of claim 14, further comprising determining if the training period correlates with a pseudotraining signal.

16. A method for receiving at a base station having an associated cell site identifier (ID), a time slot of information having a training period therein, the method comprising:
    receiving the time slot of information and outputting a receive signal based thereon;
    determining if the training period includes the cell site ID associated with the base station;
    discarding the time slot of information if the cell site ID is not included in the training period;
    decoding the time slot of information if the cell site ID is included in the training period; and
    performing synchronization functions based on the information in the training period if the cell site ID is included in the training period.

17. A method for receiving at a base station having an associated cell site identifier (ID), a time slot of information having a training period therein, the method comprising:
    receiving the time slot of information and outputting a receive signal based thereon;
    determining if the training period includes the cell site ID associated with the base station;
    discarding the time slot of information if the cell site ID is not included in the training period;
    decoding the time slot of information if the cell site ID is included in the training period; and
    performing branch delay estimation based on the information in the training period if the cell site ID is included in the training period.

* * * * *